(12) United States Patent
Stamps et al.

(10) Patent No.: US 11,203,418 B2
(45) Date of Patent: Dec. 21, 2021

(54) MOUNT SYSTEMS FOR PYLON ASSEMBLIES WITH COAXIAL ROTORS

(71) Applicant: Textron Innovations Inc., Providence, RI (US)

(72) Inventors: Frank Bradley Stamps, Colleyville, TX (US); Michael Reaugh Smith, Colleyville, TX (US); Michael Scott Seifert, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 142 days.

(21) Appl. No.: 16/717,095

(22) Filed: Dec. 17, 2019

(65) Prior Publication Data

US 2020/0398976 A1 Dec. 24, 2020

Related U.S. Application Data

(60) Provisional application No. 62/864,744, filed on Jun. 21, 2019.

(51) Int. Cl.
| | | |
|---|---|---|
| *B64C 27/10* | (2006.01) | |
| *B64C 29/00* | (2006.01) | |
| *B64C 27/12* | (2006.01) | |
| *B64C 27/52* | (2006.01) | |
| *B64C 27/82* | (2006.01) | |
| *B64C 27/32* | (2006.01) | |
| *B64C 27/00* | (2006.01) | |

(52) U.S. Cl.
CPC .......... *B64C 27/10* (2013.01); *B64C 29/0033* (2013.01); *B64C 27/001* (2013.01); *B64C 27/12* (2013.01); *B64C 27/32* (2013.01); *B64C 27/52* (2013.01); *B64C 2027/002* (2013.01); *B64C 2027/8236* (2013.01); *B64C 2027/8281* (2013.01)

(58) Field of Classification Search
CPC ....... B64C 27/001; B64C 27/10; B64C 27/43; B64C 27/52; B64C 2027/002
See application file for complete search history.

(56) References Cited

U.S. PATENT DOCUMENTS

| | | | |
|---|---|---|---|
| 3,698,663 A | | 10/1972 | Balke et al. |
| 3,921,940 A | * | 11/1975 | Mouille ................ B64C 27/001 244/17.27 |
| 4,372,431 A | * | 2/1983 | Desjardins ............ B64C 27/001 188/380 |

(Continued)

*Primary Examiner* — Philip J Bonzell
*Assistant Examiner* — Tye William Abell
(74) *Attorney, Agent, or Firm* — Lawrence Youst PLLC

(57) ABSTRACT

A mount system for tiltably supporting a pylon assembly of a rotorcraft. First, second, third and fourth pylon links are each coupled between the pylon assembly and the airframe of the rotorcraft. The first pylon link has a first axis, the second pylon link has a second axis, the third pylon link has a third axis and the fourth pylon link has a fourth axis. Each of the axes intersects at a focal point located proximate a coaxial rotor system having counter-rotating upper and lower rotor assemblies such that the focal point provides a virtual pivot point about which the pylon assembly tilts to generate a control moment about a center of gravity of the rotorcraft that counteracts lateral and fore/aft moments generated by the upper and lower rotor assemblies during rotorcraft maneuvers.

13 Claims, 8 Drawing Sheets

(56) References Cited

U.S. PATENT DOCUMENTS

| | | | | |
|---|---|---|---|---|
| 6,283,408 | B1* | 9/2001 | Ferullo | B64C 27/001 |
| | | | | 244/17.27 |
| 6,325,327 | B1* | 12/2001 | Zoppitelli | B64C 27/001 |
| | | | | 244/17.27 |
| 7,631,835 | B2* | 12/2009 | Ferrer | B64C 27/001 |
| | | | | 244/1 N |
| 8,113,321 | B2* | 2/2012 | McGuire | F16F 13/262 |
| | | | | 188/266.3 |
| 9,169,012 | B2 | 10/2015 | Corrigan et al. | |
| 9,550,565 | B2 | 1/2017 | Corrigan et al. | |
| 2008/0142633 | A1* | 6/2008 | McGuire | B64C 27/001 |
| | | | | 244/17.27 |
| 2010/0001120 | A1* | 1/2010 | Sun | B64C 27/26 |
| | | | | 244/6 |
| 2015/0136900 | A1* | 5/2015 | Griffin | B64D 35/00 |
| | | | | 244/54 |
| 2015/0139800 | A1* | 5/2015 | Hendricks | B64C 27/001 |
| | | | | 416/134 A |
| 2017/0291699 | A1* | 10/2017 | Hunter | B64C 27/10 |
| 2018/0265186 | A1* | 9/2018 | Foskey | B64C 27/001 |

* cited by examiner

MOUNT SYSTEMS FOR PYLON ASSEMBLIES WITH COAXIAL ROTORS

CROSS-REFERENCE TO RELATED APPLICATIONS

The present application claims the benefit of U.S. Provisional Application No. 62/864,744, filed Jun. 21, 2019.

TECHNICAL FIELD OF THE DISCLOSURE

The present disclosure relates, in general, to mount systems for supporting the pylon assembly of a rotorcraft and, in particular, to mount systems for tiltably supporting a pylon assembly having a virtual pivot point located proximate the upper and lower rotor assemblies of a counter-rotating coaxial rotor system.

BACKGROUND

Conventional, single rotor helicopters have a limited upper speed due to the problem of retreating blade stall, in which the rotor blade on the retreating side of the rotor disc in forward flight, experiences a loss of lift due to the rotorcraft's linear forward flight velocity exceeding the rotor blade's minimum angular velocity for lift production. Attempts have been made to overcome the upper speed limitations caused by retreating blade stall. For example, various compound helicopter designs have been attempted that utilize lift compounding, propulsion compounding or both to overcome retreating blade stall. Lift compounding may be achieved by adding wings to the fuselage to partially offload the lift requirement from the main rotor during forward flight. Propulsion compounding may be achieved by adding one or more auxiliary propulsive systems such as a propeller or jets to partially or fully offload the thrust requirement from the main rotor during forward flight.

As another example, attempts have been made to utilize counter-rotating coaxial rotor systems on rotorcraft in which one or more rotor blades advance on both sides of the rotorcraft during flight to overcome retreating blade stall. In one implementation, a dual counter-rotating coaxial rotor system includes two counter-rotating rotor assemblies to provide advancing blades on both sides of the rotorcraft. Conventional dual counter-rotating coaxial rotor systems utilize rigid pylon mounting systems and rigid rotor systems. It has been found, however, that during certain maneuvers using such rigid systems, creates excessive hub moments that may result in inflight rotor interference and, in extreme cases, inflight rotor intermeshing. Accordingly, a need has arisen for improved systems that overcome the existing hub moment risks inherent in conventional dual counter-rotating coaxial rotor systems.

SUMMARY

In a first aspect, the present disclosure is directed to a mount system for supporting a pylon assembly of a rotorcraft having an airframe. The pylon assembly includes a coaxial rotor system having counter-rotating upper and lower rotor assemblies. The mount system includes first, second, third and fourth pylon links coupled between the pylon assembly and the airframe. The first pylon link has a first axis, the second pylon link has a second axis, the third pylon link has a third axis and the fourth pylon link has a fourth axis. The first, second, third and fourth pylon links are oriented such that each of the first, second, third and fourth axes intersects at a focal point located proximate the coaxial rotor system. The focal point provides a virtual pivot point about which the pylon assembly tilts to generate a control moment about a center of gravity of the rotorcraft that counteracts lateral and fore/aft moments generated by the upper and lower rotor assemblies during rotorcraft maneuvers.

In some embodiments, the focal point may be located between the upper and lower rotor assemblies such as intermediate of the upper and lower rotor assemblies. In certain embodiments, the focal point may be located below the upper rotor assembly including locations below the lower rotor assembly. In some embodiments, the focal point may be located above the lower rotor assembly including locations above the upper rotor assembly. In certain embodiments, the focal point may be located proximate a mast axis of the pylon assembly including locations coincident with the mast axis.

In some embodiments, the first, second, third and fourth pylon links may be coupled to the pylon assembly and the airframe with spherical bearings. In certain embodiments, the first, second, third and fourth pylon links may be rigid pylon links. In some embodiments, the mount system may include fifth and sixth pylon links coupled between the pylon assembly and the airframe. In such embodiments, the fifth pylon link may have a fifth axis and the sixth pylon assembly may have a sixth axis both of which are approximately parallel with a longitudinal axis of the rotorcraft. Also, in such embodiments, the mount system may have a seventh pylon link coupled between the pylon assembly and the airframe. The seventh pylon link may have a seventh axis that is approximately parallel with a lateral axis of the rotorcraft. The fifth, sixth and seventh pylon links may form a torque restraint and vibration isolation subsystem. In certain embodiments, the pylon assembly may include a transmission and the first, second, third and fourth pylon links may be coupled to the transmission. In some embodiments, the first, second, third and fourth pylon links may be circumferentially disposed around the pylon assembly.

In a second aspect, the present disclosure is directed to a rotorcraft including an airframe and a pylon assembly having a coaxial rotor system with counter-rotating upper and lower rotor assemblies. First, second, third and fourth pylon links are coupled between the pylon assembly and the airframe. The first pylon link has a first axis, the second pylon link has a second axis, the third pylon link has a third axis and the fourth pylon link has a fourth axis. The first, second, third and fourth pylon links are oriented such that each of the first, second, third and fourth axes intersects at a focal point located proximate the coaxial rotor system. The focal point provides a virtual pivot point about which the pylon assembly tilts to generate a control moment about a center of gravity of the rotorcraft that counteracts lateral and fore/aft moments generated by the upper and lower rotor assemblies during rotorcraft maneuvers.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1B:
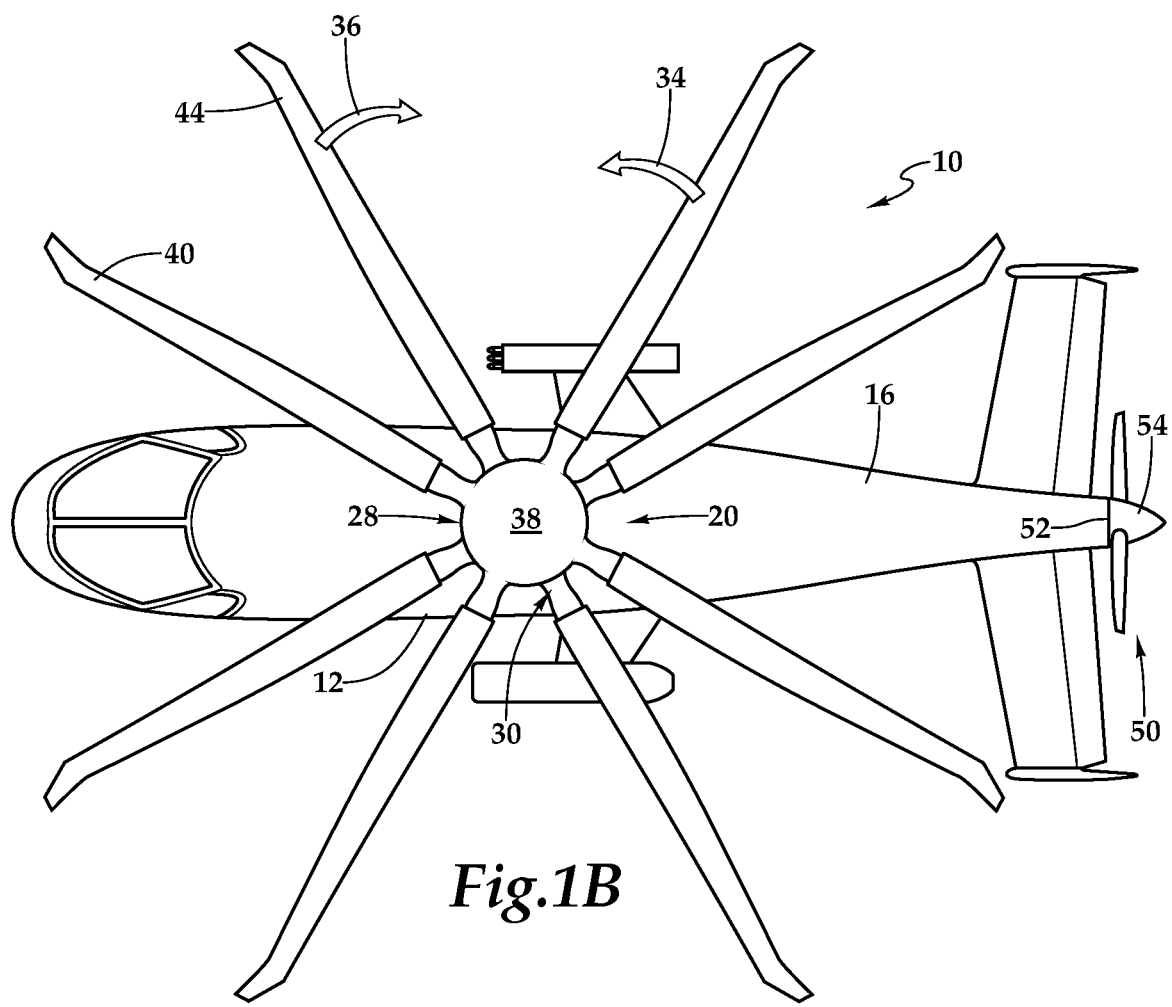
FIGS. 1A-1D are schematic illustrations of a rotorcraft having a mount system for tiltably supporting a pylon assembly having a coaxial rotor system in accordance with embodiments of the present disclosure.
Figure 1A:
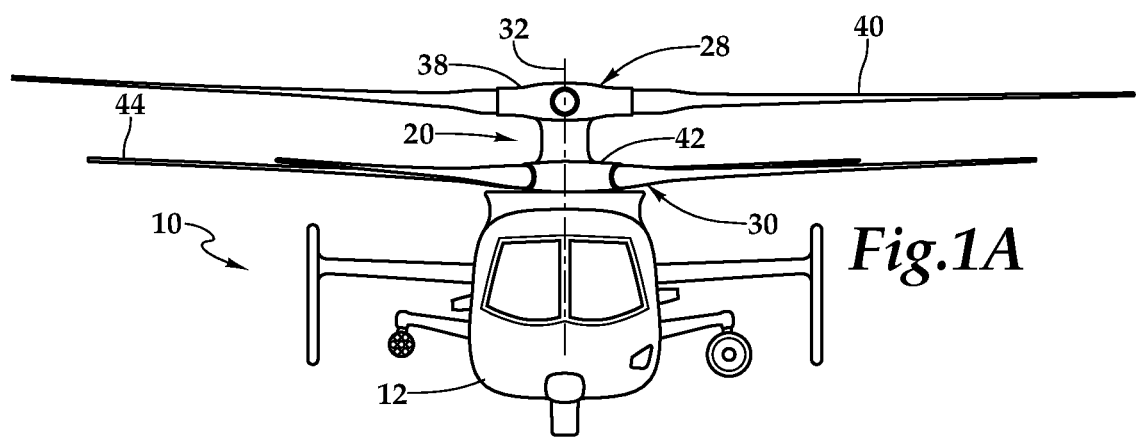
Figure 1D:
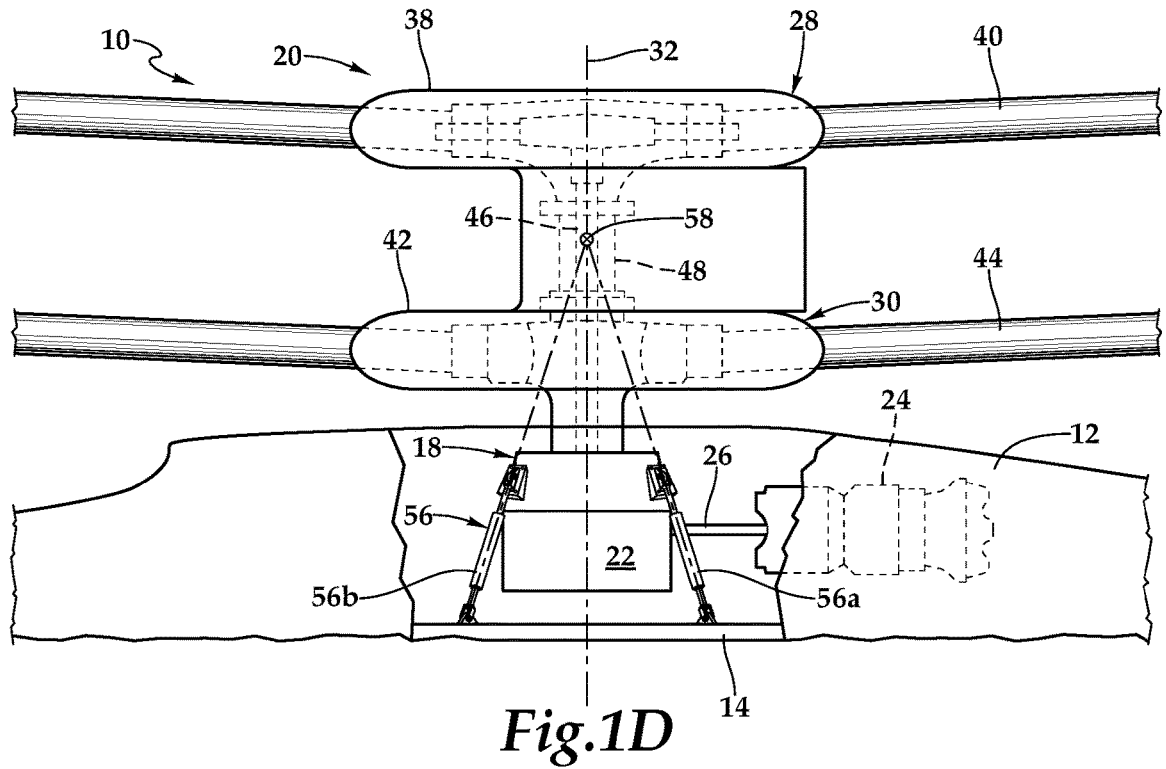
Figure 1C:
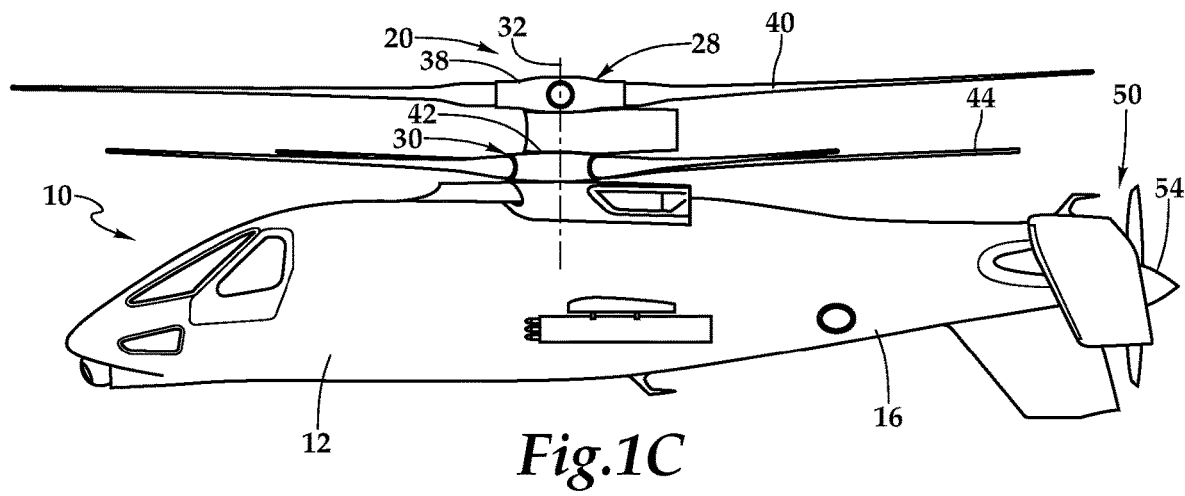

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including moving and/or non-moving mechanical connections.

Referring to FIGS. 1A-1D in the drawings, a rotorcraft depicted as a helicopter is schematically illustrated and generally designated 10. Rotorcraft 10 includes a fuselage 12 supported by an airframe 14. A tailboom 16 extends aft of fuselage 12 and supports a tail assembly depicted as a twin tail or H-tail having horizontal and vertical stabilizers and optionally having moveable aerosurfaces such as elevators and/or fins. Rotorcraft 10 includes a pylon assembly 18 having a coaxial rotor system 20 and a transmission 22, or gearbox, which is powered by one or more engines 24 via a drive shaft 26. Coaxial rotor system 20 includes upper and lower rotor assemblies 28, 30 that counter-rotate relative to one another about a mast axis 32. Upper rotor assembly 28 is rotatable in a first direction 34 about mast axis 32. Lower rotor assembly 30 is rotatable in a second direction 36 about mast axis 32, which is opposite to first direction 34. While first direction 34 is illustrated as counter-clockwise and second direction 36 is illustrated as clockwise in FIG. 1B, it will be appreciated that in some embodiments the directions of rotation of upper rotor assembly 28 and lower rotor assembly 30 may be reversed.

Upper rotor assembly 28 includes upper rotor hub assembly 38 from which a plurality of rotor blade assemblies 40 radially project outward. Similarly, lower rotor assembly 30 includes lower rotor hub assembly 42 from which a plurality of rotor blade assemblies 44 radially project outward. Upper and lower rotor assemblies 28, 30 may each include any number of rotor blade assemblies 40, 44. Upper and lower rotor assemblies 28, 30 are coaxially mounted above fuselage 12. In particular, upper rotor hub assembly 38 is mounted to an inner rotor shaft 46. Inner rotor shaft 46 counter rotates within an outer rotor shaft 48, to which lower rotor hub assembly 42 is mounted. Upper and lower rotor assemblies 28, 30 may be rigid, hingeless and/or stiff-in-plane. Rotor blade assemblies 40, 44 may be capable of collective and/or cyclic pitch change operations. It should be understood that various blade attachments may be utilized by rotorcraft 10. Upper and lower rotor assemblies 28, 30 may be constant or variable speed. In some embodiments, upper and lower rotor assemblies 28, 30 may be capable of tilting together in the same direction or may tilt at different angles relative to one another.

In the illustrated embodiment, rotorcraft 10 is a compound helicopter that includes translational thrust system 50 located at aft end 52 of tailboom 16. Translational thrust system 50 includes a pusher propeller 54 that propels rotorcraft 10 in a forward direction. Assisted by pusher propeller 54, rotorcraft 10 may be capable of high forward airspeed. By providing propulsion for rotorcraft 10, pusher propeller 54 may reduce the drag burden on coaxial rotor system 20. Pusher propeller 54 may be a variable pitch pusher propeller and may be clutchable. Pusher propeller 54 may be powered by engine 24 via a gearbox, such as transmission 22.

Because upper and lower rotor assemblies 28, 30 can generate hub moments such as lateral and fore/aft moments on fuselage 12 during certain operations of rotorcraft 10, the illustrated embodiment utilizes a mount system 56 for tiltably supporting pylon assembly 18. Mount system 56 includes four pylon links that are coupled between pylon assembly 18 and airframe 14. Each of the pylon links has an axis that is directed to a focal point 58 located proximate coaxial rotor system 20 such as between or intermediate of upper and lower rotor assemblies 28, 30. Focal point 58 provides a virtual pivot point about which pylon assembly 18 tilts to generate control moments 60 about the center of gravity 62 of rotorcraft 10 that counteract the lateral and fore/aft moments generated by upper and lower rotor assemblies 28, 30.

Figure 2A:
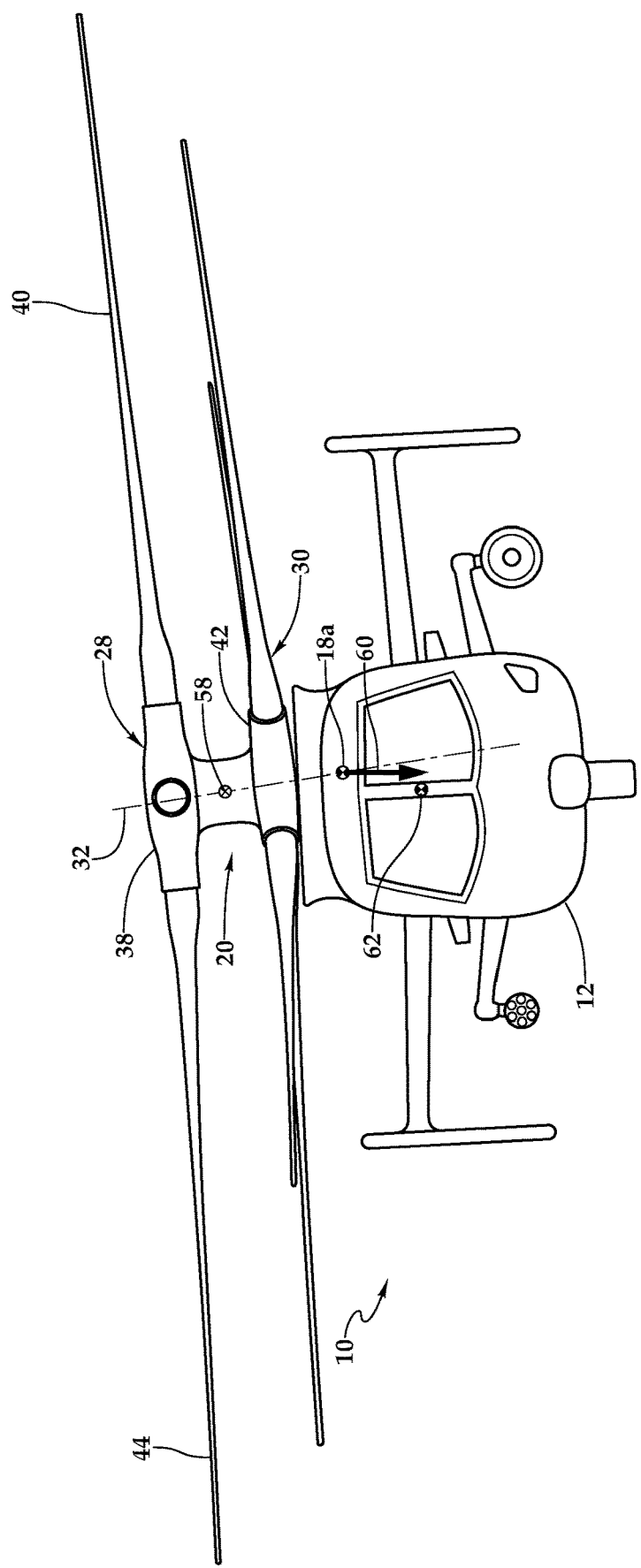
FIGS. 2A-2B are schematic illustrations of the rotorcraft of FIG. 1 during lateral maneuvers in accordance with embodiments of the present disclosure.
Figure 2B:
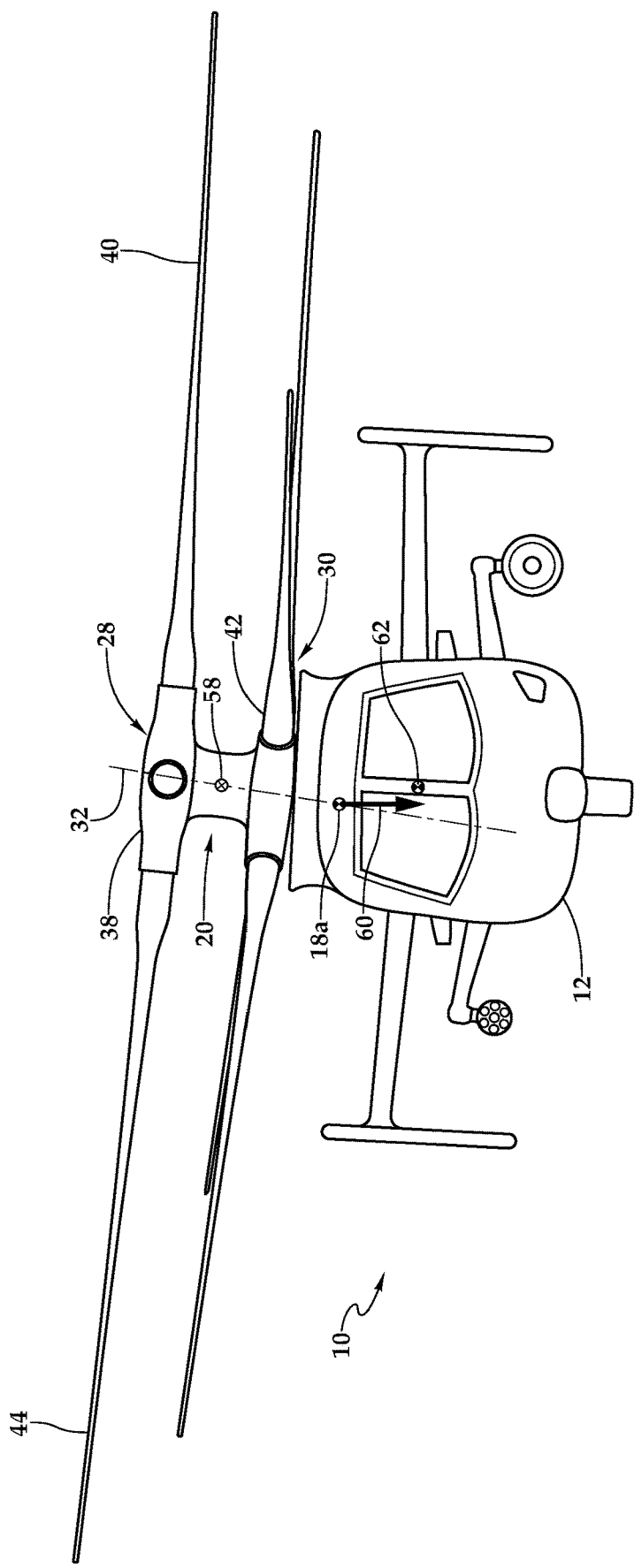

For example, as best seen in FIG. 2A, if the pilot were to move the cyclic lever to the right, this would tend to increase the angle of attack of rotor blades 40, 44 of upper and lower rotor assemblies 28, 30 on the left side of rotorcraft 10 relative to rotor blades 40, 44 of upper and lower rotor assemblies 28, 30 on the right side of rotorcraft 10. This causes an unbalanced lift which in turns causes rotorcraft 10 to roll to the right, enabling movement of rotorcraft 10 to the right. Likewise, as best seen in FIG. 2B, if the pilot were to move the cyclic lever to the left, this would tend to increase the angle of attack of rotor blades 40, 44 of upper and lower rotor assemblies 28, 30 on the right side of rotorcraft 10 relative to rotor blades 40, 44 of upper and lower rotor assemblies 28, 30 on the left side of rotorcraft 10. This causes an unbalanced lift which in turns causes rotorcraft 10 to roll to the left, enabling movement of rotorcraft 10 to the left.

During such maneuvers, upper and lower rotor assemblies 28, 30 create lateral moments that act on fuselage 12. As discussed herein, with coaxial rotor systems having a rigid pylon mounting system, these lateral moments can become excessive resulting in inflight rotor interference and/or intermeshing. These outcomes are avoided with the present embodiments, however, as pylon assembly 18 is operable to tilt about the virtual pivot point created at focal point 58 of the pylon link axes. The center of mass of pylon assembly 18, denoted as 18*a*, thus shifts in the direction opposite of the cyclic input to provide control moments 60 about the center of gravity 62 of rotorcraft 10 that counteract the lateral moments generated by upper and lower rotor assemblies 28, 30. The control moments 60 not only reduce the peak magnitude of the lateral moments acting on rotorcraft 10, but also increase the time period to reach the peak magnitude of the lateral moments thus smoothing the moment curve associated with operations of upper and lower rotor assemblies 28, 30, thereby avoiding instantaneous and/or large step changes in the moment curve associated with conventional coaxial rotor systems having a rigid pylon mounting system.

Returning to the example in FIG. 2A, when the pilot provides cyclic input to the right, the center of mass 18*a* of pylon assembly 18 moves to the left and provides control moment 60 that tends counteract the right roll movement of rotorcraft 10. Likewise, in FIG. 2B, when the pilot provides cyclic input to the left, the center of mass 18*a* of pylon assembly 18 moves to the right and provides control moment 60 that tends counteract the left roll movement of rotorcraft 10. In this manner, the use of mount system 56 to enable tilting of pylon assembly 18 prevents upper and lower rotor assemblies 28, 30 from generating excessive lateral moments. Similarly, when the pilot provides forward cyclic input, the center of mass 18*a* of pylon assembly 18 moves aft and provides a control moment that tends counteract the pitch down movement of rotorcraft 10 and when the pilot provides aft cyclic input, the center of mass 18*a* of pylon assembly 18 moves forward and provides a control moment that tends counteract the pitch up movement of rotorcraft 10. In this manner, the use of mount system 56 to enable tilting of pylon assembly 18 prevents upper and lower rotor assemblies 28, 30 from generating excessive fore/aft moments. Thus, as should be apparent to persons having ordinary skill in the art, cyclic input in any direction causes pylon assembly 18 to tilt about the virtual pivot point shifting the center of mass 18*a* in the opposite direction which generates a control moment about the center of gravity of rotorcraft 10 that counteracts lateral and fore/aft moments generated by upper and lower rotor assemblies 28, 30.

Figure 3A:
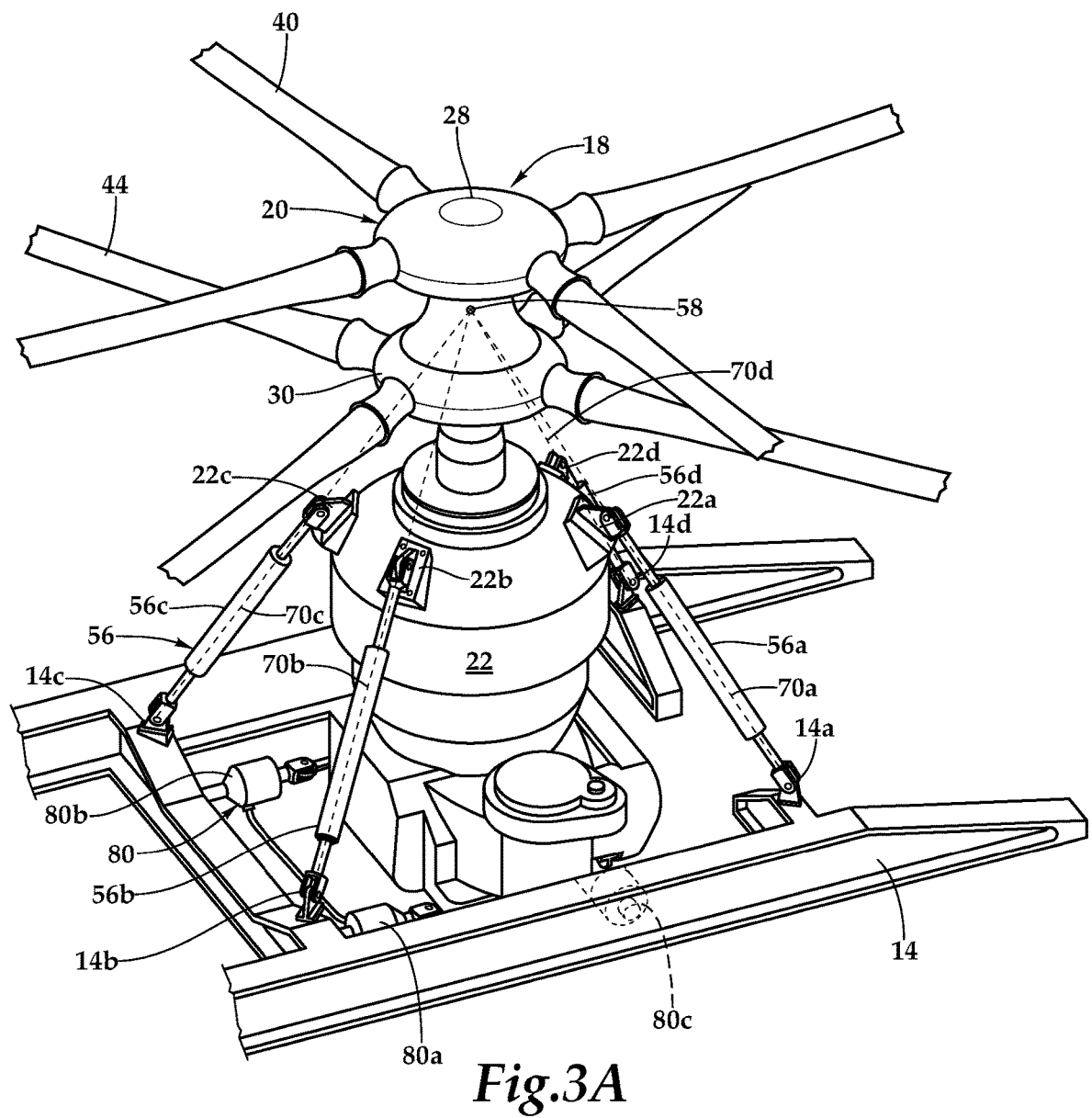
FIGS. 3A-3C are various views of a mount system for tiltably supporting a pylon assembly having a coaxial rotor system in accordance with embodiments of the present disclosure.
Figure 3B:
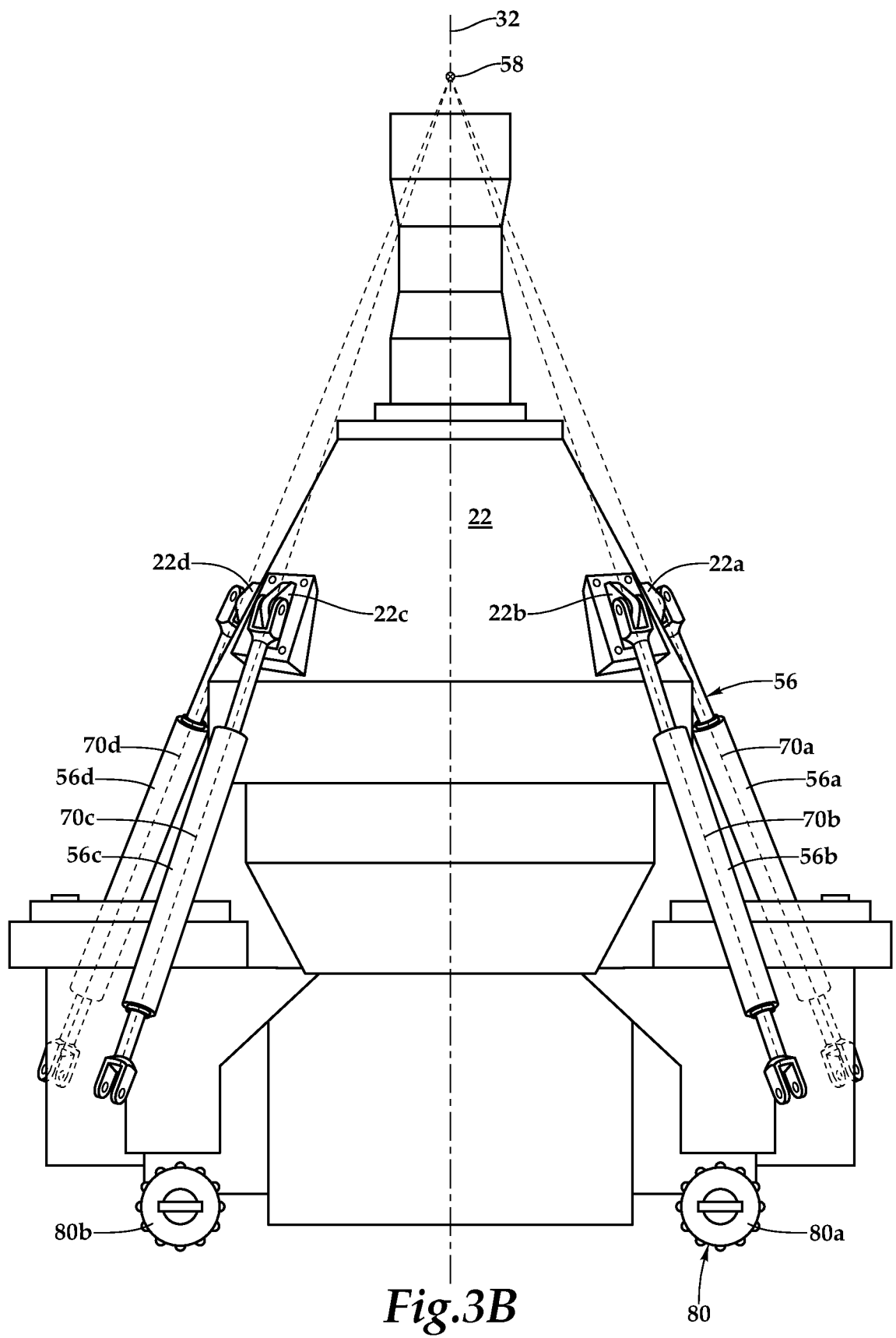
Figure 3C:
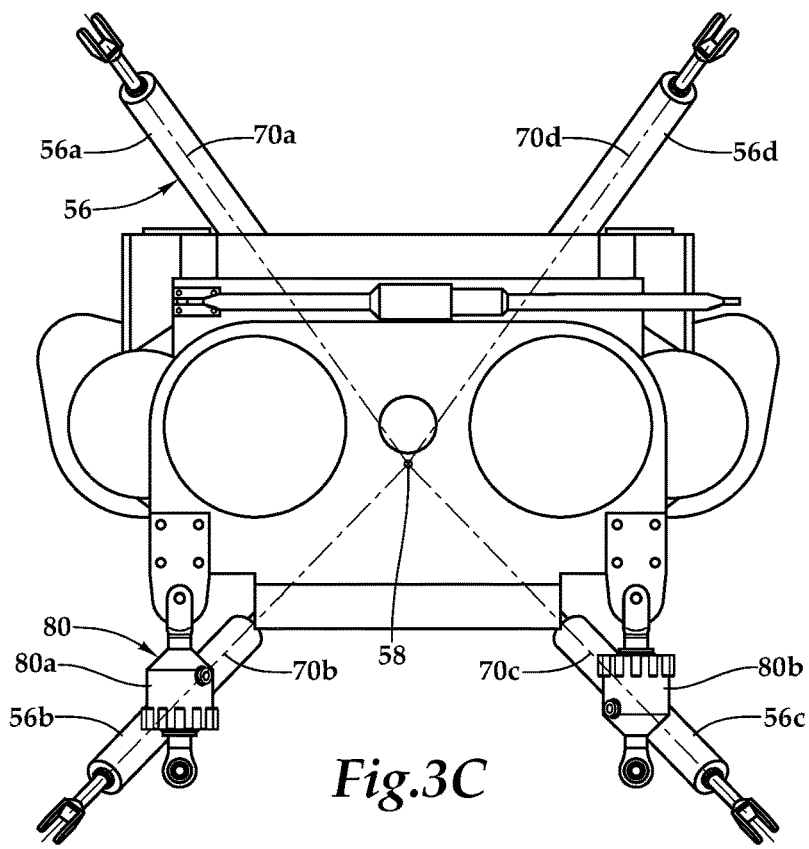

Referring to FIG. 3A-3C in the drawings, mount system 56 for tiltably supporting pylon assembly 18 of rotorcraft 10 is shown in greater detail. Pylon assembly 18 includes coaxial rotor system 20 with upper and lower rotor assemblies 28, 30 and transmission 22. Mount system 56 includes a plurality of pylon links depicted as pylon link 56*a*, pylon link 56*b*, pylon link 56*c* and pylon link 56*d*. At their upper ends, each of pylon links 56*a*, 56*b*, 56*c*, 56*d* is coupled to transmission 22 at a respective lug 22*a*, 22*b*, 22*c*, 22*d* that are circumferentially disposed around transmission 22 at uniform or non-uniform intervals. Preferably, each of the couplings is formed with a spherical bearing to allow relative angular movement therebetween. At their lower ends, each of pylon links 56*a*, 56*b*, 56*c*, 56*d* is coupled to airframe 14 at a respective lug 14*a*, 14*b*, 14*c*, 14*d*. Preferably, each of these couplings is formed with a spherical bearing to allow relative angular movement therebetween. The use of the spherical bearings at each coupling between pylon links 56*a*, 56*b*, 56*c*, 56*d*, transmission 22 and airframe 14 allows pylon assembly 18 to tilt relative to airframe 14 responsive to lateral and fore/aft moments generated by upper and lower rotor assemblies 28, 30. In the illustrated embodiment, pylon links 56*a*, 56*b*, 56*c*, 56*d* are depicted as rigid pylon links. In other embodiments, pylon links 56*a*, 56*b*, 56*c*, 56*d* could have additional features such as vibration isolation functionality.

As illustrated, left aft pylon link 56*a* has a central axis 70*a*, left forward pylon link 56*b* has a central axis 70*b*, right forward pylon link 56*c* has a central axis 70*c* and right rear pylon link 56*d* has a central axis 70*d*. Pylon links 56*a*, 56*b*, 56*c*, 56*d* are structurally coupled between airframe 14 and transmission 22, such that central axes 70*a*, 70*b*, 70*c*, 70*d* are angled relative to mast axis 32, as best seen in FIG. 3B. More specifically, pylon links 56*a*, 56*b*, 56*c*, 56*d* are oriented such that central axes 70*a*, 70*b*, 70*c*, 70*d* converge at focal point 58, thus forming a converging plurality of pylon links. The convergence of central axes 70*a*, 70*b*, 70*c*, 70*d* as well as the spherical bearing couplings allows pylon assembly 18 to tilt about a virtual pivot point that is coincident with focal point 58.

Preferably, focal point 58 is located proximate coaxial rotor system 20. In the illustrated embodiment, focal point 58 is located between upper and lower rotor assemblies 28, 30 and more precisely, focal point 58 is located intermediate of upper and lower rotor assemblies 28, 30. In certain embodiments, focal point 58 may be described as being located below upper rotor assembly 28 and/or above lower rotor assembly 30. In some embodiments, focal point 58 may be located above upper rotor assembly 28. For example, the spacing between upper and lower rotor assemblies 28, 30 may preferably be about 10 percent to 20 percent of the rotor radius. This distance will be referred to herein as the rotor spacing distance RSD. In embodiments having focal point 58 located above upper rotor assembly 28, the distance above upper rotor assembly 28 may be up to about 1 RSD, up to about 0.75 RSD, up to about 0.5 RSD, up to about 0.25 RSD or other suitable distance above upper rotor assembly 28. Alternatively, focal point 58 may be located below lower rotor assembly 30 in which case the distance below lower rotor assembly 30 may be up to about 1 RSD, up to about 0.75 RSD, up to about 0.5 RSD, up to about 0.25 RSD or other suitable distance below lower rotor assembly 30. In addition, focal point 58 is preferably located proximate mast axis 32 including, for example, at a location coincident with mast axis 32.

Figure 4A:
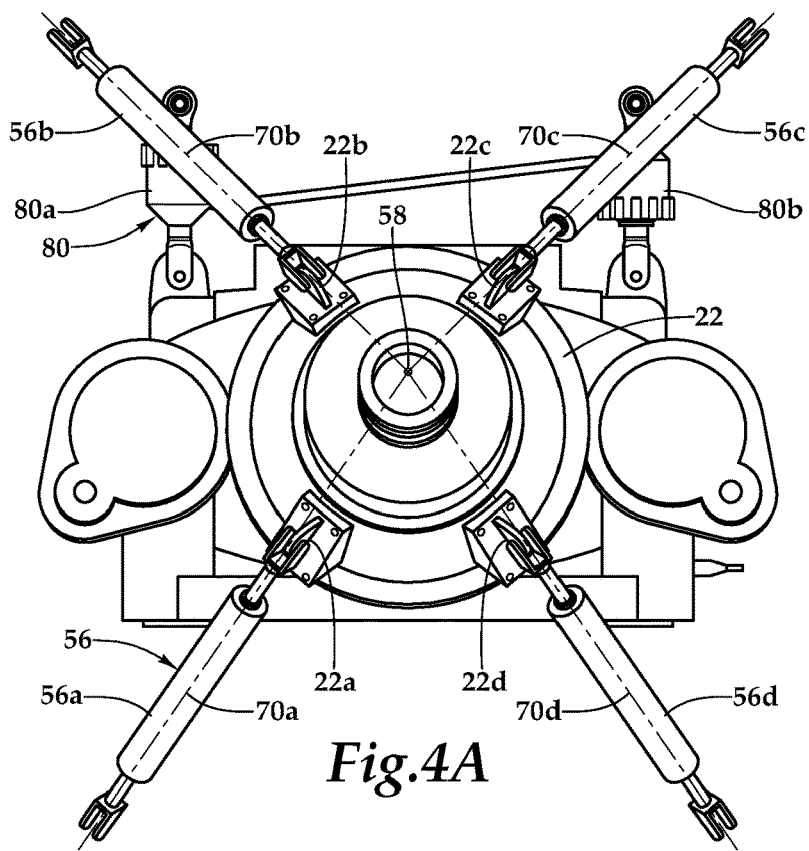
FIGS. 4A-4C are various views of a torque restraint and vibration isolation subsystem of a mount system for tiltably supporting a pylon assembly having a coaxial rotor system in accordance with embodiments of the present disclosure.
Figure 4B:
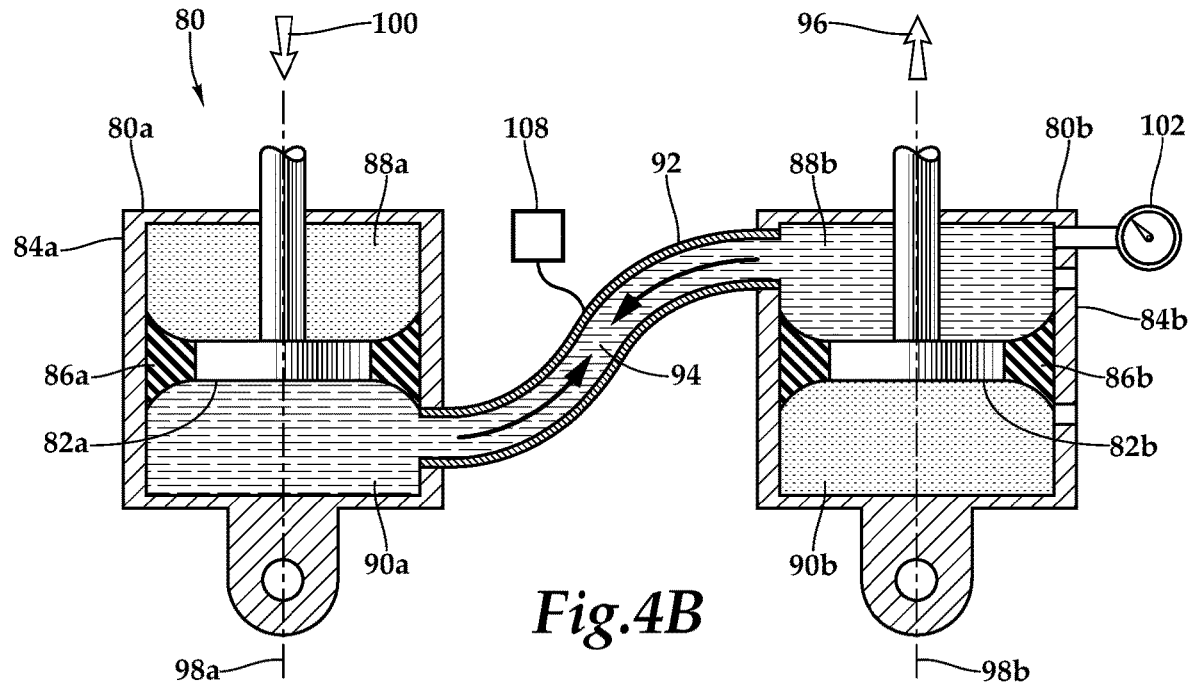
Figure 4C:
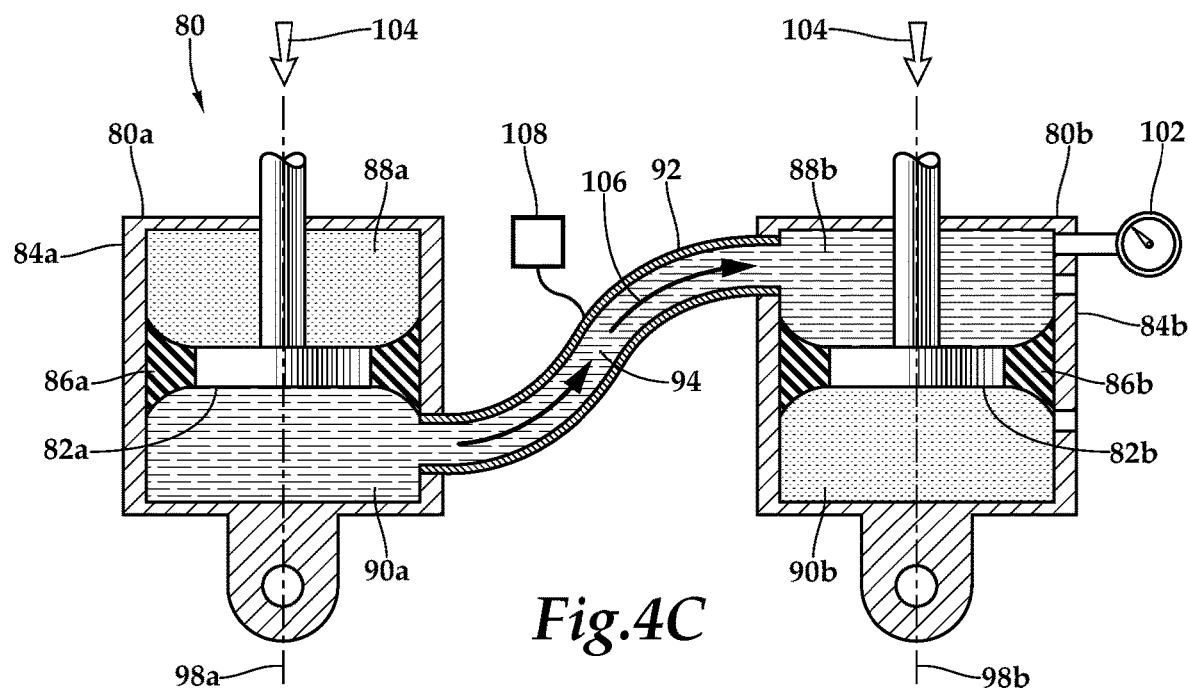

Referring additionally to FIGS. 4A-4C, a torque restraint and vibration isolation subsystem 80 of mount system 56 is illustrated in further detail. As stated herein, each end of pylon links 56*a*, 56*b*, 56*c*, 56*d* is coupled to transmission 22 and airframe 14 with spherical bearings to prevent pylon links 56*a*, 56*b*, 56*c*, 56*d* from reacting to loads in unintended directions. For example, fore/aft loads and torsional loads are not reacted by pylon links 56*a*, 56*b*, 56*c*, 56*d*, but rather by torque restraint and vibration isolation subsystem 80. Torque restraint and vibration isolation subsystem 80 has a substantially horizontal orientation relative to rotorcraft 10 and includes left fore/aft pylon link 80*a* having a central axis parallel to the longitudinal axis of rotorcraft 10, right fore/aft pylon link 80*b* having a central axis parallel to the longitudinal axis of rotorcraft 10 and lateral pylon link 80*c* having a central axis parallel to the lateral axis of rotorcraft 10 that provide torque restraint, torque measurement and vibration isolation. Torque restraint and vibration isolation subsystem 80 may be particularly well suited to accompany pylon links 56a, 56b, 56c, 56d of the present embodiments that are configured to not react to fore/aft loads and torque loads. However, it should be appreciated that other torque restraint and vibration isolation subsystem may alternatively accompany pylon links 56a, 56b, 56c, 56d in a mount system of the present disclosure.

Left fore/aft pylon link 80a has a piston 82a resiliently coupled to a housing 84a with an elastomeric member 86a. Piston 82a and elastomeric member 86a divide housing 84a into a first chamber 88a and a second chamber 90a. Similarly, right fore/aft pylon link 80b has a piston 82b resiliently coupled to a housing 84b with an elastomeric member 86b. Piston 82b and elastomeric member 86b divide housing 84b into a first chamber 88b and a second chamber 90b. Second chamber 90a, first chamber 88b and a fluid line 92 are filled with a fluid 94. First chamber 88a and second chamber 90b do not require fluid 94 and thus can be open or vented rather than being enclosed chambers. For example, first chamber 88a and second chamber 90b can be filled with air, or open/vented to atmosphere.

In operation, torque restraint and vibration isolation subsystem 80 is configured to resist or react to torque loads and measure torque loads, as well as attenuate vibration in the fore/aft direction. Referring in particular to FIG. 4B, torque restraint and vibration isolation subsystem 80 is illustrated with regard to the reaction and measurement of torque loads. During operation of rotorcraft 10, some torque or torsional vibration may be carried in the mast and into transmission 22. Various maneuvers and operations of rotorcraft 10 can cause the amount of torque to vary significantly. Pylon links 56a, 56b, 56c, 56d are configured to not react to torque, thus the torque experienced by transmission 22 is reacted to by left fore/aft pylon link 80a and right fore/aft pylon link 80b. Preferably, left fore/aft pylon link 80a and right fore/aft pylon link 80b are mounted with spherical bearings so that the torque load is substantially realized as a forward directional load 96 along axis 98b and aft direction load 100 along axis 98a. Forward directional load 96 attempts to pull piston 82b forward, but the equal and opposite aft directional load 100 attempts to push piston 82a, thereby creating a fluid lock since fluid 94 in second chamber 90a is in fluid communication with fluid 94 in first fluid chamber 88b via fluid line 92. As such, the torque is restrained with a stiffness that is dependent upon the bulk modulus, or stiffness, of the implementation-specific fluid 94. Furthermore, the amount of torque reacted to by left fore/aft pylon link 80a and right fore/aft pylon link 80b may be measured by a pressure sensor 102. Pressure sensor 102 may be in communication with one or more processors for analysis. In another embodiment, pressure sensor 102 is in communication with a visual gauge in the cockpit of rotorcraft 10 so that the operator can evaluate the torque in real time. It should be appreciated that the direction of forward directional load 96 and aft direction load 100 can be directionally reversed to accommodate torsional vibrations in both directions.

With specific reference to FIG. 4C, torque restraint and vibration isolation subsystem 80 is illustrated with regard to the isolation of oscillatory vibration of pylon assembly 18 in the fore/aft direction. Oscillatory vibration loads can be generated during operation, some of which may have a fore/aft component. An oscillatory load left untreated would be realized as a vibration in rotorcraft 10. For illustrative purposes, the oscillatory load is schematically shown in an aft direction by arrows 104. However, it should be appreciated that the load oscillates in the fore/aft direction at a certain frequency. When the load is in the aft direction, shown by arrows 104, pistons 82a, 82b are pushed aft, which decreases the volume of fluid 94 in second chamber 90a and increases the volume of fluid 84 in first chamber 88b, thereby creating a net shift in fluid 94 in a forward direction 106. The axial shift in fluid 94 acts to cancel the load input in that the mass of the fluid shift creates an inertial mass cancellation of the input. Since the fore/aft load oscillates fore/aft at a certain frequency, torque restraint and vibration isolation subsystem 80 employs the principle that the acceleration of an oscillating mass is 180 degrees out of phase with its displacement. Fluid line 92 acts as an inertia track and can be tuned so that torque restraint and vibration isolation subsystem 80 attenuates vibration at a desired frequency. Further, if the fore/aft oscillatory load varies, then an optional active pumper 108 can be utilized to actively adjust the isolation frequency by imparting pumping fluid 108 at a frequency that adjusts the isolation frequency. In some embodiments, left fore/aft pylon link 80a and right fore/aft pylon link 80b may be passive vibration isolators that do not require a power source to be operational such as Liquid Inertia Vibration Eliminator (LIVE™) units.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A mount system for tiltably supporting a pylon assembly of a rotorcraft having an airframe, the pylon assembly including a coaxial rotor system having a mast axis and counter-rotating upper and lower rotor assemblies that are rotatable about the mast axis, the mount system comprising:
    a first pylon link coupled between the pylon assembly and the airframe, the first pylon link having a first axis;
    a second pylon link coupled between the pylon assembly and the airframe, the second pylon link having a second axis;
    a third pylon link coupled between the pylon assembly and the airframe, the third pylon link having a third axis; and
    a fourth pylon link coupled between the pylon assembly and the airframe, the fourth pylon link having a fourth axis;
    wherein, the first, second, third and fourth pylon links are oriented such that each of the first, second, third and fourth axes intersects at a focal point located along the mast axis between the upper and lower rotor assemblies; and
    wherein, the first, second, third and fourth pylon links are configured such that the focal point acts as a pivot point about which the pylon assembly tilts to generate control moments about a center of gravity of the rotorcraft that counteract lateral and fore/aft moments generated by the upper and lower rotor assemblies during rotorcraft maneuvers.

2. The mount system as recited in claim 1 wherein the focal point is located coincident with a midpoint between the upper and lower rotor assemblies.

3. The mount system as recited in claim 1 wherein each of the first, second, third and fourth pylon links are coupled to the pylon assembly and the airframe with spherical bearings.

4. The mount system as recited in claim 1 wherein each of the first, second, third and fourth pylon links is a rigid pylon link.

5. The mount system as recited in claim 1 wherein the pylon assembly further comprises a transmission and wherein the first, second, third and fourth pylon links are coupled to the transmission.

6. The mount system as recited in claim 1 wherein the first, second, third and fourth pylon links are circumferentially disposed around the pylon assembly.

7. The mount system as recited in claim 1 further comprising:
a fifth pylon link coupled between the pylon assembly and the airframe, the fifth pylon link having a fifth axis that is parallel with a longitudinal axis of the rotorcraft; and
a sixth pylon link coupled between the pylon assembly and the airframe, the sixth pylon link having a sixth axis that is parallel with the longitudinal axis of the rotorcraft.

8. The mount system as recited in claim 7 further comprising:
a seventh pylon link coupled between the pylon assembly and the airframe, the seventh pylon link having a seventh axis that is parallel with a lateral axis of the rotorcraft.

9. The mount system as recited in claim 8 wherein the fifth, sixth and seventh pylon links further comprise a torque restraint and vibration isolation subsystem.

10. A rotorcraft comprising:
an airframe;
a pylon assembly including a coaxial rotor system having a mast axis and counter-rotating upper and lower rotor assemblies that are rotatable about the mast axis;
a first pylon link coupled between the pylon assembly and the airframe, the first pylon link having a first axis;
a second pylon link coupled between the pylon assembly and the airframe, the second pylon link having a second axis;
a third pylon link coupled between the pylon assembly and the airframe, the third pylon link having a third axis; and
a fourth pylon link coupled between the pylon assembly and the airframe, the fourth pylon link having a fourth axis;
wherein, the first, second, third and fourth pylon links are oriented such that each of the first, second, third and fourth axes intersects at a focal point located along the mast axis between the upper and lower rotor assemblies; and
wherein, the first, second, third and fourth pylon links are configured such that the focal point acts as a pivot point about which the pylon assembly tilts to generate control moments about a center of gravity of the rotorcraft that counteract lateral and fore/aft moments generated by the upper and lower rotor assemblies during rotorcraft maneuvers.

11. The rotorcraft as recited in claim 10 wherein each of the first, second, third and fourth pylon links is coupled to the pylon assembly and the airframe with spherical bearings.

12. The rotorcraft as recited in claim 10 further comprising:
a fifth pylon link coupled between the pylon assembly and the airframe, the fifth pylon link having a fifth axis that is parallel with a longitudinal axis of the rotorcraft;
a sixth pylon link coupled between the pylon assembly and the airframe, the sixth pylon link having a sixth axis that is parallel with the longitudinal axis of the rotorcraft; and
a seventh pylon link coupled between the pylon assembly and the airframe, the seventh pylon link having a seventh axis that is parallel with a lateral axis of the rotorcraft;
wherein the fifth, sixth and seventh pylon links further comprise a torque restraint and vibration isolation subsystem.

13. The rotorcraft as recited in claim 10 further comprising a pusher propeller configured to provide forward thrust to the rotorcraft.

* * * * *